US006431821B1

(12) United States Patent
Feltenberger et al.

(10) Patent No.: US 6,431,821 B1
(45) Date of Patent: Aug. 13, 2002

(54) HIGH TORQUE IMPULSE TURBINE

(75) Inventors: Bruce D. Feltenberger, Hudson; Ronald S. Feltenberger, Munroe Falls, both of OH (US)

(73) Assignee: Universal Electric Power Corp.

( * ) Notice: Subject to any disclaimer, the term of this patent is extended or adjusted under 35 U.S.C. 154(b) by 0 days.

(21) Appl. No.: 09/817,451

(22) Filed: Mar. 26, 2001

Related U.S. Application Data

(63) Continuation-in-part of application No. 09/065,404, filed on Apr. 24, 1998, now Pat. No. 6,206,630.

(51) Int. Cl.[7] .............................................. F03B 15/06
(52) U.S. Cl. ..................... 415/3.1; 415/4.1; 415/906; 415/1; 60/398; 290/54
(58) Field of Search ...................... 415/2.1, 3.1, 4.1, 415/1, 906; 416/196 A, 78, 187, 201 R, DIG. 4; 60/398; 290/42, 54

(56) References Cited

U.S. PATENT DOCUMENTS

| | | | |
|---|---|---|---|
| 973,241 A | 10/1910 | Vestal et al. ................ 415/906 |
| 1,061,399 A | * | 5/1913 | Osborne ..................... 415/140 |
| 4,076,447 A | | 2/1978 | Granath et al. ............... 415/3.1 |
| 4,104,536 A | | 8/1978 | Gutsfeld ....................... 290/54 |
| 4,187,686 A | | 2/1980 | Pommier ...................... 60/647 |
| 4,274,008 A | | 6/1981 | Feltenberger ................ 290/42 |
| 4,629,904 A | | 12/1986 | Rojo, Jr. et al. .............. 290/52 |
| 4,636,141 A | * | 1/1987 | Sedlacek ............... 416/DIG. 4 |
| 4,717,831 A | * | 1/1988 | Kikuchi ....................... 290/54 |
| 5,430,332 A | | 7/1995 | Dunn, Jr. ..................... 415/3.1 |
| 5,440,175 A | * | 8/1995 | Mayo et al. .................. 415/3.1 |
| 5,755,553 A | | 5/1998 | Laemthongsawad ........ 415/3.1 |
| 5,808,369 A | * | 9/1998 | Whelan ........................ 290/54 |
| 6,206,630 B1 | * | 3/2001 | Feltenberger et al. ........ 415/3.1 |

* cited by examiner

*Primary Examiner*—Edward K. Look
*Assistant Examiner*—Richard Woo
(74) *Attorney, Agent, or Firm*—Emerson & Skeriotis; Roger D. Emerson; Timothy D. Bennett

(57) ABSTRACT

A water driven impulse turbine has a barrel rotatably mounted upon an axle, with a plurality of runner blades extending tangentially from said barrel. Side plates secure the runner blades on opposite sides thereof. A breastplate is maintained in concentric juxtaposition with the wheel so defined. A penstock is interposed between a water source and the breastplate to pass water into the runner blades. The turbine may consist of a plurality of axially interconnected wheel sections of similar or dissimilar nature to optimize performance.

27 Claims, 18 Drawing Sheets

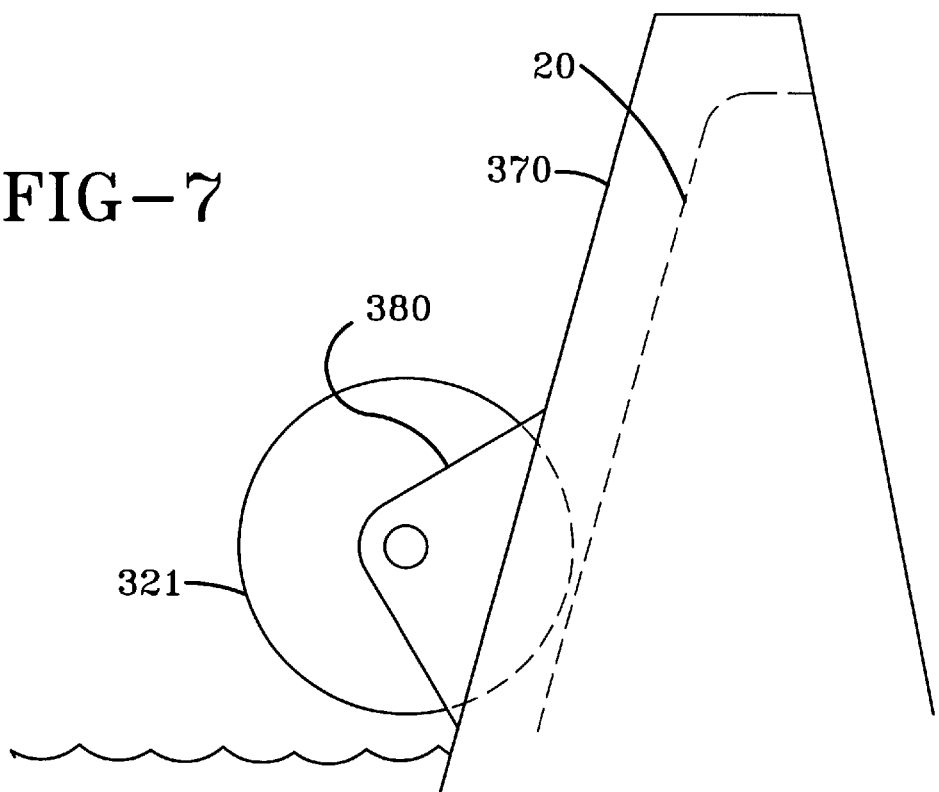
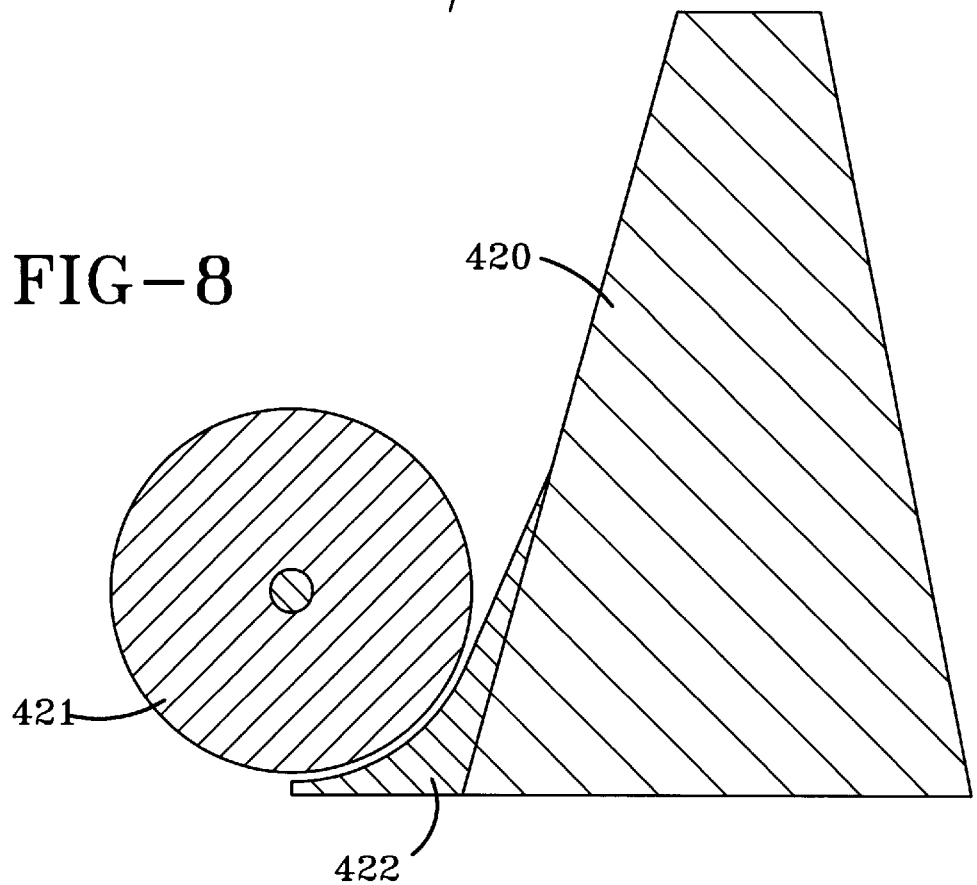

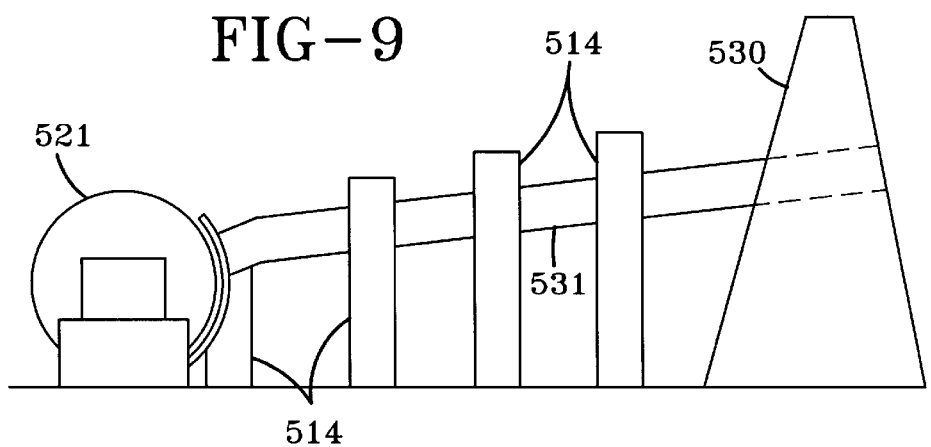
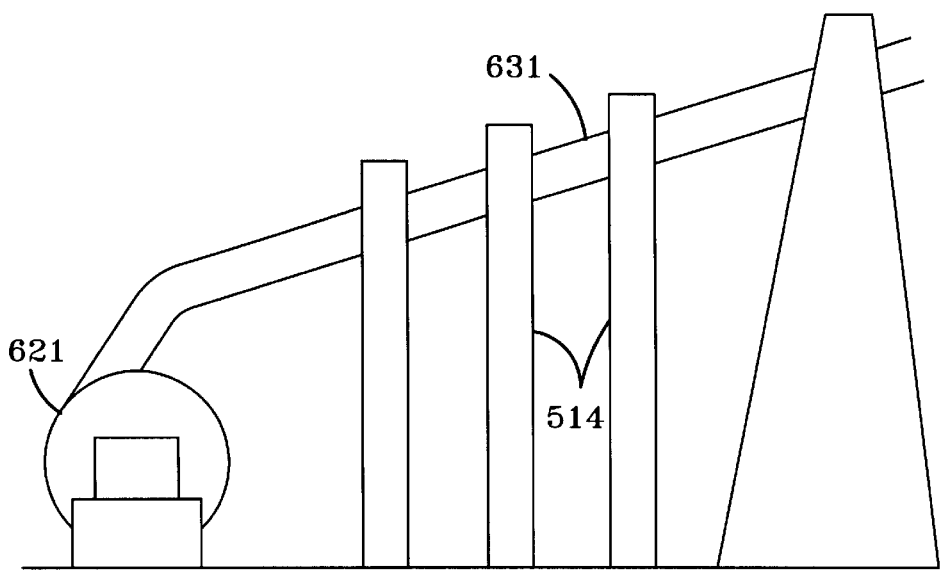

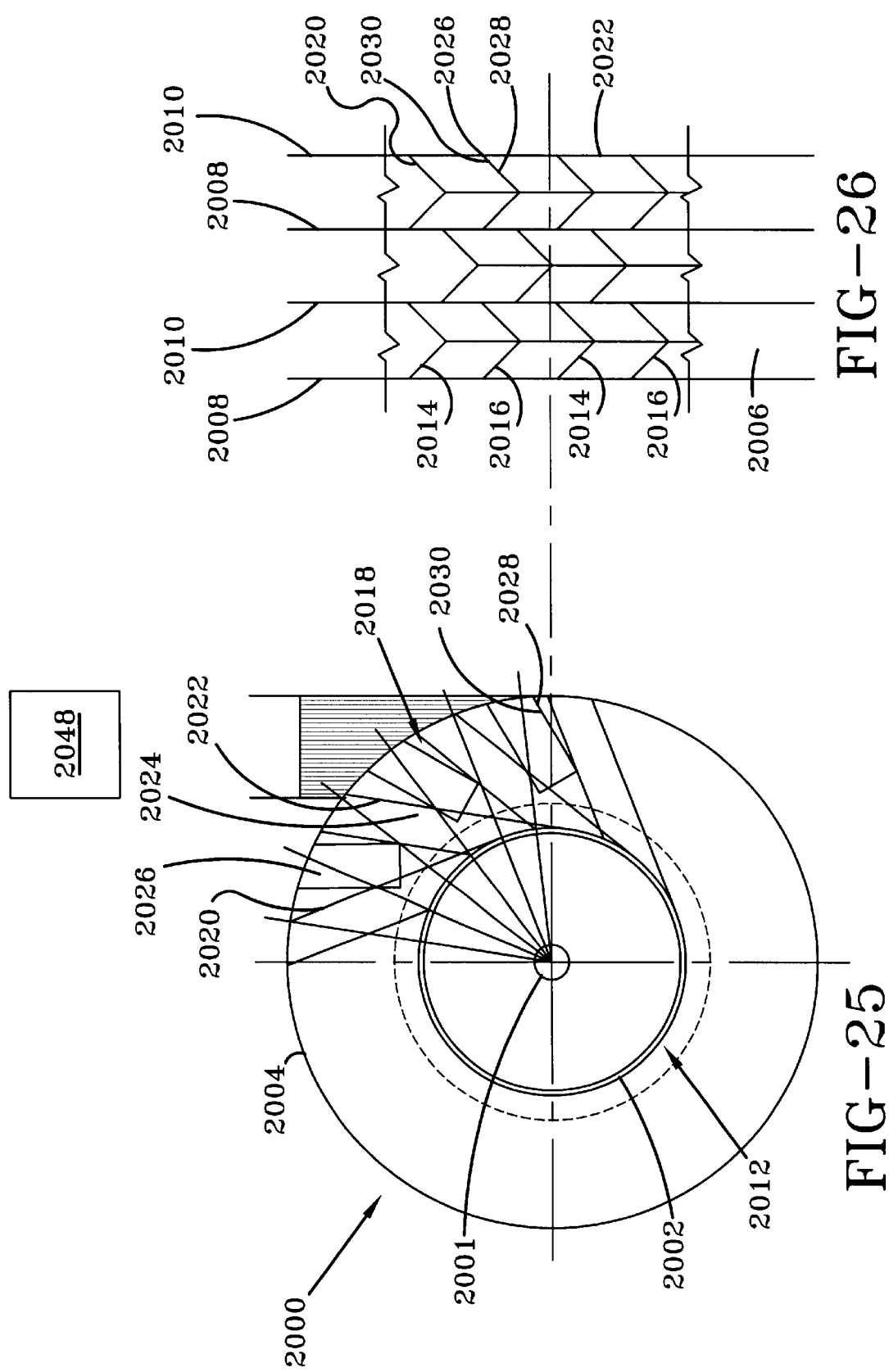

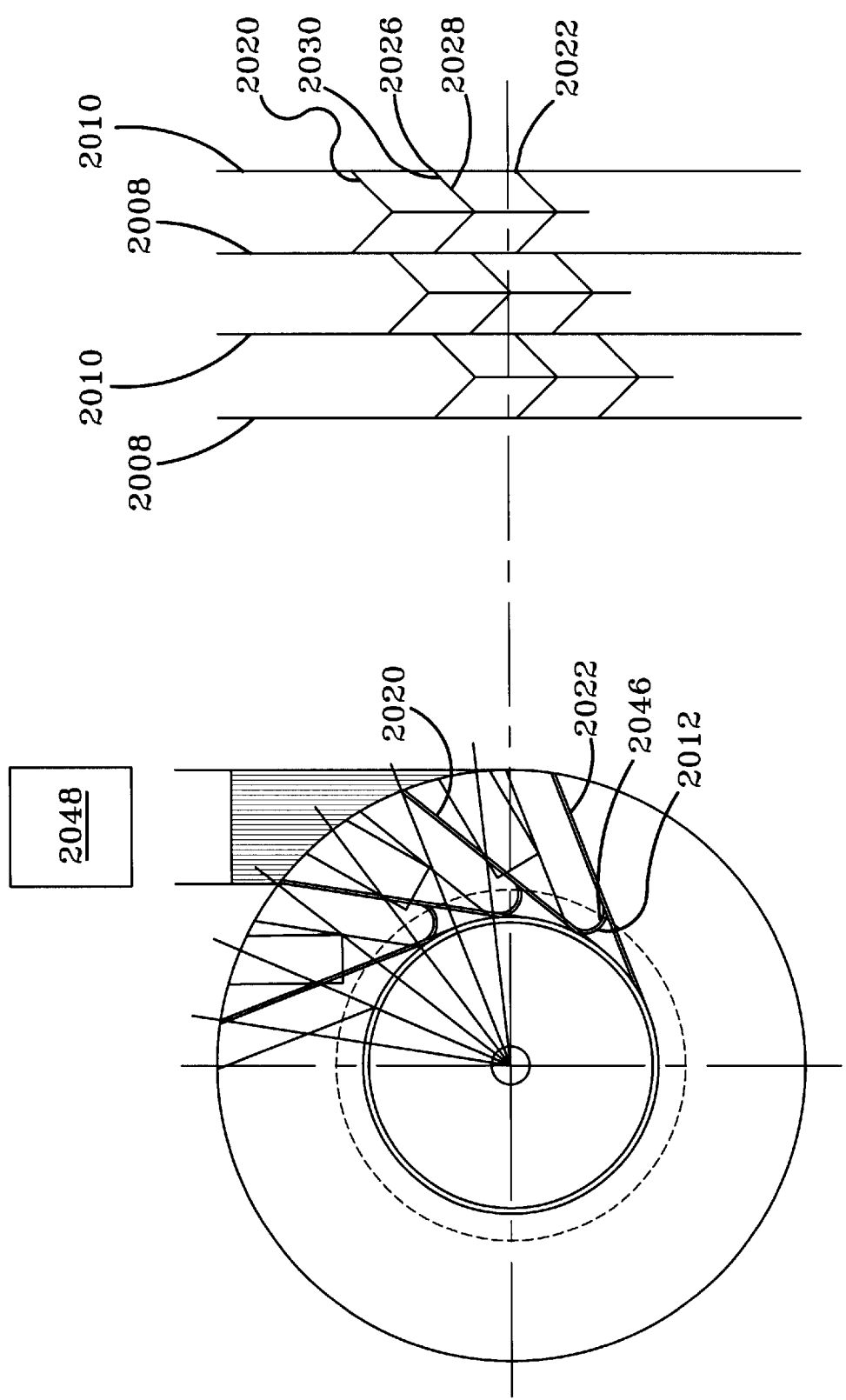

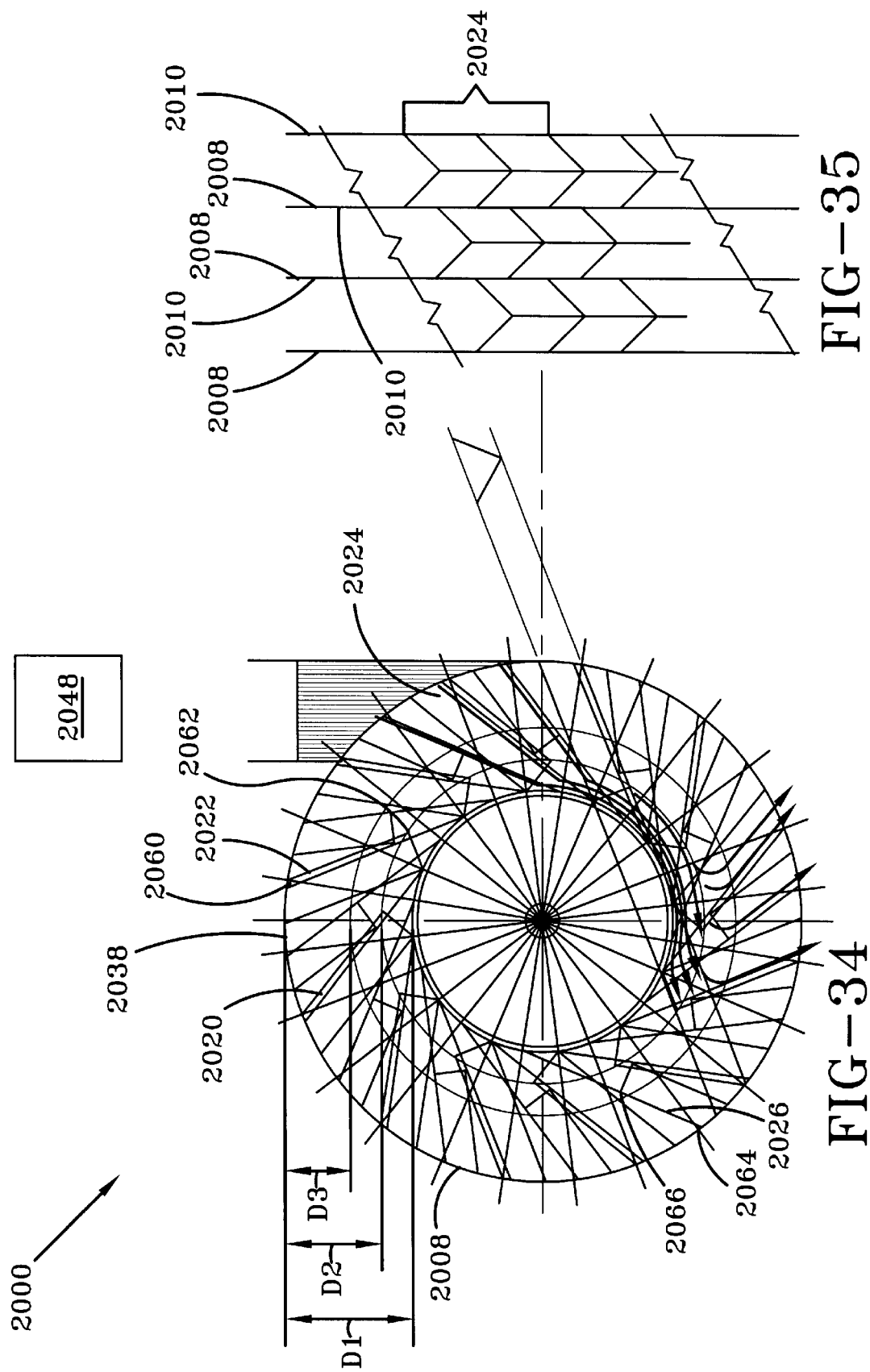

HIGH TORQUE IMPULSE TURBINE

This continuation-in-part application claims priority from a U.S. Ser. No. 09/065,404, now U.S. Pat. No. 6,206,630, filed Apr. 24, 1998, issued Mar. 27, 2001.

BACKGROUND OF THE INVENTION

1. Field of the Invention

The invention herein, referred to as a tangential water wheel and also referred to as an impulse turbine, is an improvement over prior art water wheels by virtue of its design, materials, type of construction, its ability to accommodate higher head ranges and higher flow rates, and the manner in which it is used. Said device is also an improvement over impulse turbines of today by virtue of its simplified design, type of materials used in construction, lower cost to manufacture and install, its ability to operate efficiently under low to medium head ranges and its ability to operate with higher flow rates.

2. Background Art and General Description of the Invention

This invention relates generally to the field of electrical power generation by utilizing, as the prime mover, an impulse turbine, which is part of the family of tangential water wheels. The turbine is capable of being constructed in various sizes ranging from several inches in diameter to 30 feet or more, and from a few inches in width to several feet. A typical high torque turbine would be 20 feet in diameter and 5 or 6 feet in width. A horizontal axle is fixed to the turbine and rotates with it. Ideally, incoming water approaches a runner of the turbine in an undershot or a breastshot manner similar to the prior art Poncelet wheel, but the turbine may be adapted to an overshot condition or to a combination of approach angles.

The incoming water pushes against blades or buckets which are an integral part of the runner of the turbine and thereby produces rotation. The runner is designed to retain water for a of each revolution, unlike the Pelton turbine which deflects the water. To enhance retention of water, the turbine is fitted with a breastplate undercarriage which is connected to the incoming water source. The breastplate is not connected to the turbine and does not rotate.

The high torque turbine rotates relatively slowly, achieving a top speed in most cases of 45 to 60 r.p.m., and utilizes a speed increaser before connecting to a generator.

The incoming water ideally is provided by pipes or penstocks and, depending on the width of the runner, the water can be diffused through a manifold arrangement providing more than one inlet through the breastplate.

Incoming water approaches the runner tangentially and imparts all or nearly all of its energy to the runner in a tangential direction. The water travels tangentially after engaging the runner and does not substantially change direction. The water exists the runner/breastplate area at an angle combining tangential and outward flow away from the axle. The runner is designed to receive incoming water with near zero impact and discharge water with near zero forward velocity.

All of the energy transferred to the turbine from the water occurs in the outer of the turbine and thereby produces a high torque on the axle. The high torque turbine differs from the prior art Poncelet water wheel in the following ways:

1) The Poncelet water wheel was popularly used in the mid 1800's. Since then, technology advances have provided for improved materials and manufacturing processes such as close tolerance machining; the use of precision bearings producing a balanced rotation with decreased friction losses; and durability with minimum maintenance.

2) Incoming water is provided to the high torque turbine via one or more penstocks/pipes.

3) The high torque turbine offers an improved runner design which reduces or eliminates axial thrust.

4) The high torque turbine rotates faster than the Poncelet wheel and accommodates a higher head and flow rate.

5) The high torque turbine is the prime mover for producing electricity.

6) The high torque turbine is intended to be mounted on the face of a dam or adjacent to a dam near the tailwater area or near a river.

7) In its preferred form, he high torque turbine is wider than the Poncelet wheel and larger in diameter.

The high torque turbine differs from the prior art Pelton turbine in the following ways.

1) The high torque turbine retains water rather than deflecting it.

2) The high torque turbine runner design is simpler and more economical to manufacture.

3) The high torque turbine can accommodate higher flow rates and lower head ranges.

4) The high torque turbine is designed to rotate slowly.

5) The high torque turbine may utilize a breastplate to help it retain water.

6) The high torque turbine utilizes a simplified water distribution system and may or may not require nozzles.

7) The high torque turbine is intended for external use and can be installed with or without a housing.

8) The high torque turbine utilizes a speed increaser whereas the Pelton generally does not.

SUMMARY OF THE INVENTION

Objects of Invention

It is an object of the invention to provide a system for generating electricity which derives its source of power from water flowing from a higher elevation to a lower elevation.

Another object of the invention is to provide a system for generating electricity which is economical to manufacture and install at existing dams; as a part of new dam construction projects or on a bank adjacent to a river or stream.

A further object of the invention is to provide a water power generating system which combines principles of old fashioned water wheels and modern day impulse turbines.

With the above and other objects in view, the present invention consists of the combination and arrangement of parts hereinafter more fully described, illustrated in the accompanying drawings and more particularly pointed out in the appended claims, it being understood that changes may be made in the form, size, pro s and details of construction without departing from the spirit or sacrificing any of the advantages of the invention.

Specifically, the foregoing and other objects of the invention are attained by a water driven impulse turbine, comprising: an axle; a wheel mounted upon said axle, said wheel having a pair of side plates and a plurality of runner blades interposed therebetween; a breastplate fixed adjacent to and substantially concentric with said wheel; a source of water in communication with said breastplate and said runner blades, said water passing through said breastplate and against said runner blades and thereby effecting rotation of said wheel upon said axle.

GENERAL DESCRIPTION OF THE DRAWINGS

FIG. 7 is a side view taken on line 7—7 of FIG. 6.

FIG. 8 is a cross sectional view similar to FIG. 2 of yet another embodiment of the invention.

FIG. 9 is a side view similar to FIG. 4 of yet another embodiment of the invention.

FIG. 10 is a side view similar to FIG. 4 of yet another embodiment of the invention.

FIG. 25 is a cross sectional view of yet another embodiment of the present invention.

FIG. 26 is a side view of FIG. 25.

FIG. 32 is a cross sectional view of yet another embodiment of the present invention.

FIG. 33 is a side view of FIG. 32.

FIG. 34 is a cross sectional view of yet another embodiment of the present invention.

FIG. 35 is a side view of FIG. 34.

DESCRIPTION OF THE PREFERRED EMBODIMENT

Figure 1:
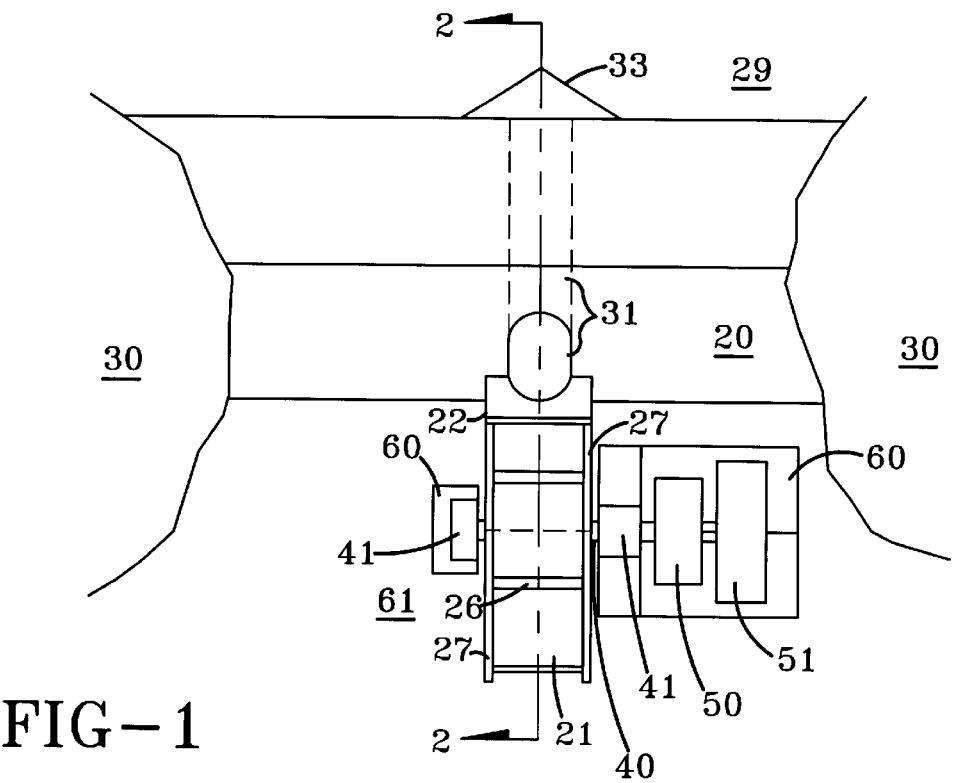
FIG. 1 is a top plan view of one. embodiment of the generating system according to the invention.
Figure 2:
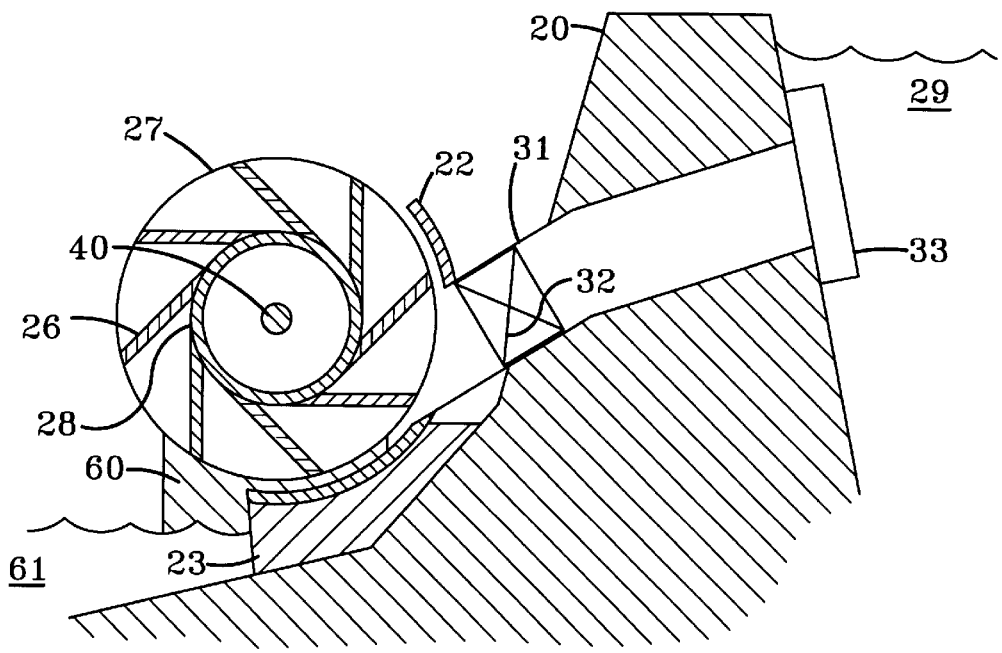
FIG. 2 is a cross-sectional view taken on line 2—2 of FIG. 1.
Figure 3:
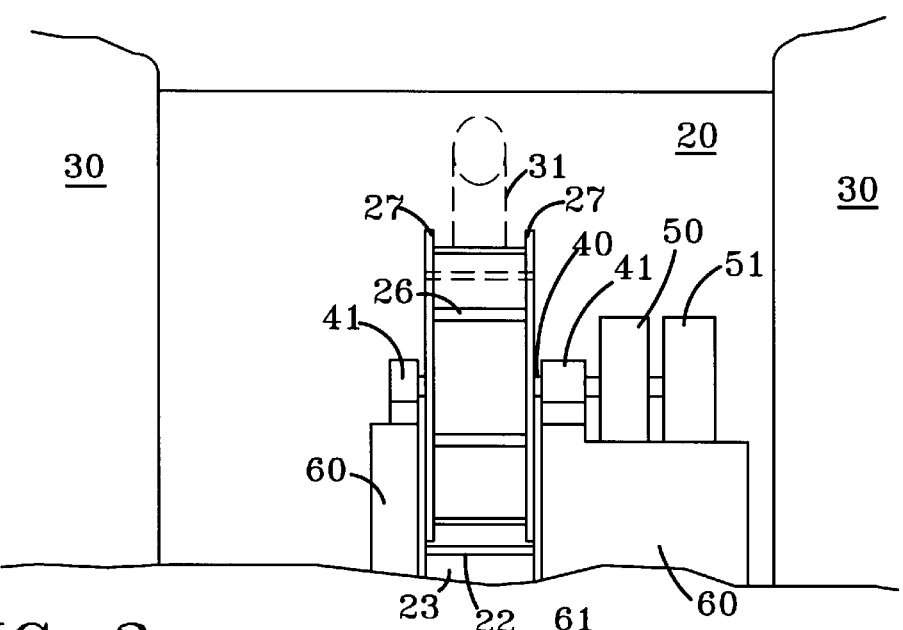
FIG. 3 is a front plan view of the embodiment of FIG. 1.

Now, with more particular reference to the drawings, in the embodiment of FIGS. 1, 2 and 3, a high torque turbine 21 is disclosed situated near the face of a dam 20. The dam 20 confines a body of water 29 referred to as a reservoir. The reservoir is also confined by earthen retainer walls 30 which could be parts of natural hills, mountains or sides of valleys. The high torque turbine 21 is fitted with a breastplate 22 which is mounted to the dam or dam substructure by means of supports 23. Said supports can be constructed from reinforced concrete or other suitable materials and can be anchored to the dam or near the dam as required. The breastplate 22 is curved to a radius exceeding the radius of the turbine, ideally by ¼ inch to 1 inch and is fixed in a stationary permanent position. The breastplate does not rotate. The breastplate is fitted to a pipe or penstock 31 which extends through the dam and provides a means of conveying water from the reservoir to the turbine. The penstock can be fitted with one or more valves and gauges 32 to control and monitor the flow of water. The valves would be ideally equipped to operate automatically and by remote control. On the reservoir side of the dam, the penstock is fitted with a trash catcher 33. The trash catcher 33 could be one of a variety of commonly available models and serves as a means of filtering debris, fish and other. animals from entering the water flow to the turbine.

The axle 40 is an integral part of the turbine and rotates with the turbine. The axle 40 is fitted with bearings near its ends which are housed and supported in bearing mounting blocks 41. The axle is coupled to a speed increasing device 50 which is preferably of a gear box variety. The speed increaser is then coupled to a generator 51 which produces electricity. The bearing mounting blocks 41, the speed increaser 50 and the generator 51 are mounted to structural supports 60 which can be made of reinforced concrete or other suitable materials and can be fastened to the dam or dam substructure as desired.

In operation, water flows from the reservoir 29, through the penstock 31, through the breastplate 22, and pushes against runner blades 26 thus producing rotation. The runner blades are fastened by any conventional means such as welding to the turbine side plates 27 and the runner barrel 28. The runner barrel 28 also is fastened to the side plates 27. The breastplate 22 serves as a means of containing all or nearly all of the incoming water in the runner part of the turbine until each blade 26 rotates past the end of the breastplate. At that time water drops or is discharged from the turbine into the tailwater area 61 adjacent to the dam. The lower end of the breastplate is approximately in line with the vertical centerline of the turbine and the higher end of the breastplate extends somewhat above the horizontal centerline of the turbine.

In the embodiment shown hereinafter, elements of like nature to those presented with respect to the embodiment of FIGS. 1–3 bear the same numeric designations and may not be discussed in detail due to their similarity to elements already presented.

Figure 4:
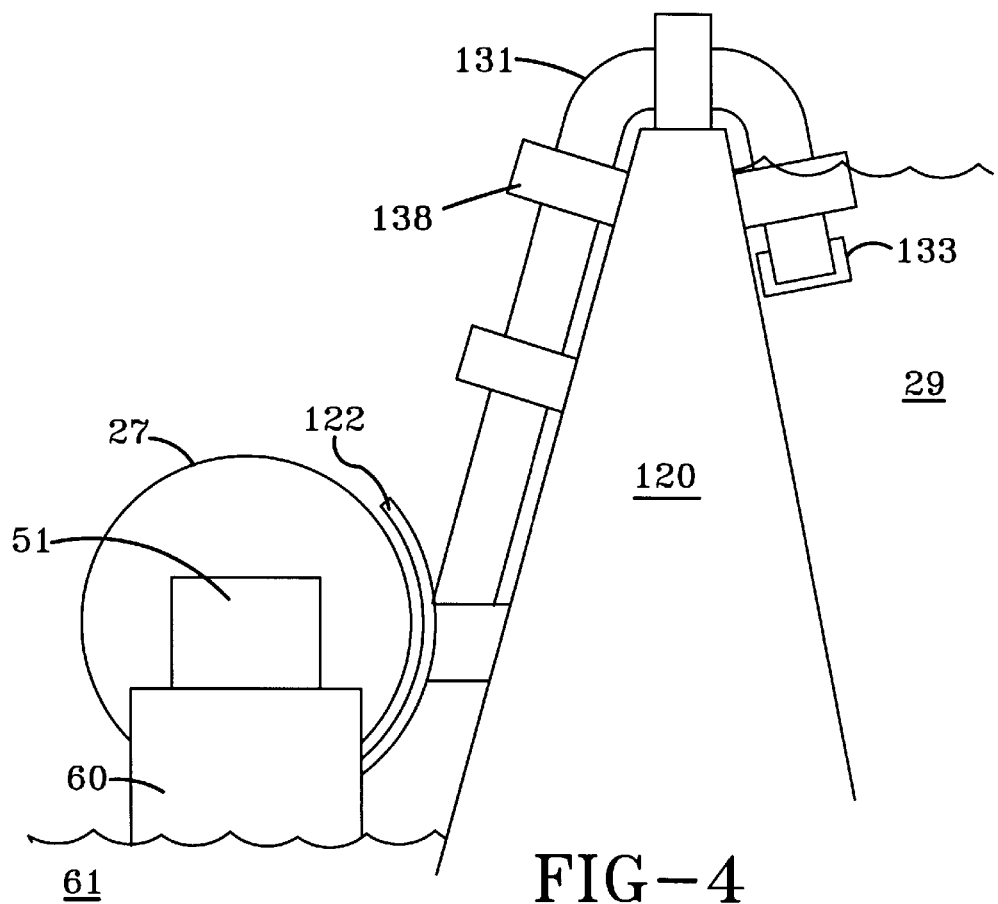
FIG. 4 is a side view of an embodiment similar to FIG. 1.

The embodiment of the invention shown in FIG. 4 is a side view of an embodiment utilizing a syphon penstock 131. The syphon penstock 131 conveys water over the dam 120 to the breastplate 122. The syphon penstock is fixed to the dam by support brackets 138 and is also fitted with a trash catcher 133.

Figure 5:
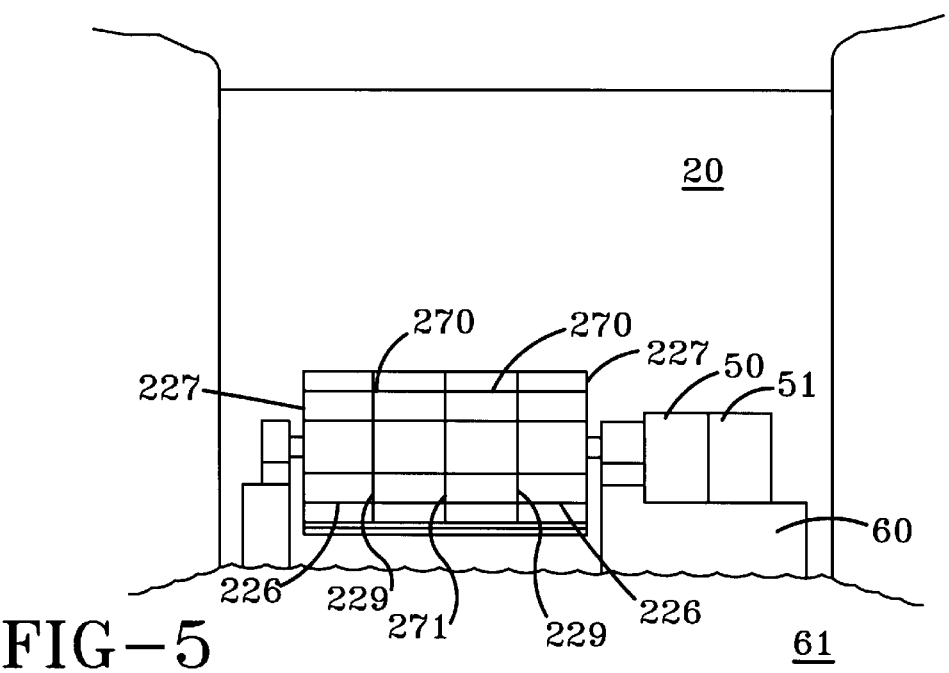
FIG. 5 is a front plan view similar to FIG. 1 of another embodiment of the invention.
Figure 6:
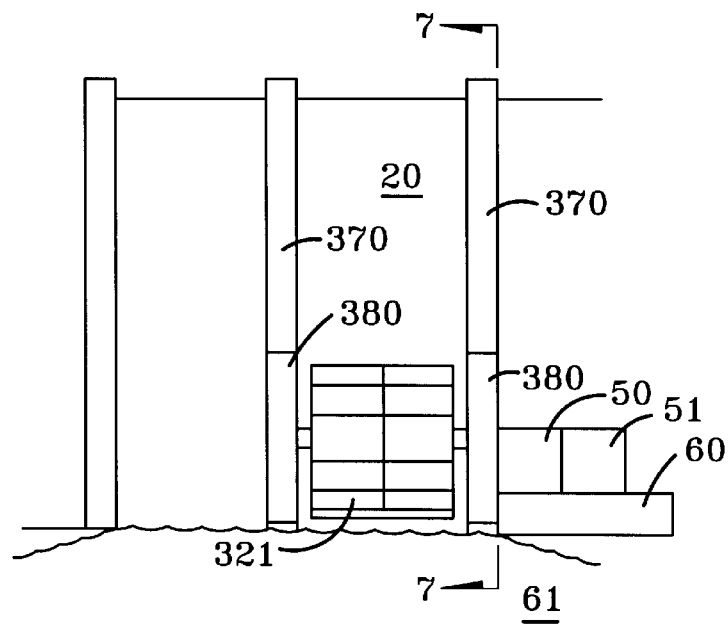
FIG. 6 is a front plan view similar to FIG. 3 of another embodiment of the invention.

The embodiment of the invention shown in FIG. 5 depicts a turbine which is substantially wider and shows four sections stacked together on the same axle. Side plates 227 are fastened to runner blades 226 which are fastened to support plates 29. Additional runner blades 270 are fastened to another support plate 271 and to support plates 229 and in this manner all sections of the turbine rotate together. Other numbers of sections may be used on the same axle thus providing an option to utilize varying widths. A wider turbine provides for a greater flow of water to act upon it. Thus a turbine ten feet wide could process twice as much water as a turbine five feet wide and a turbine fifteen feet wide would accommodate three times the flow as a turbine five feet wide.

Figure 11:
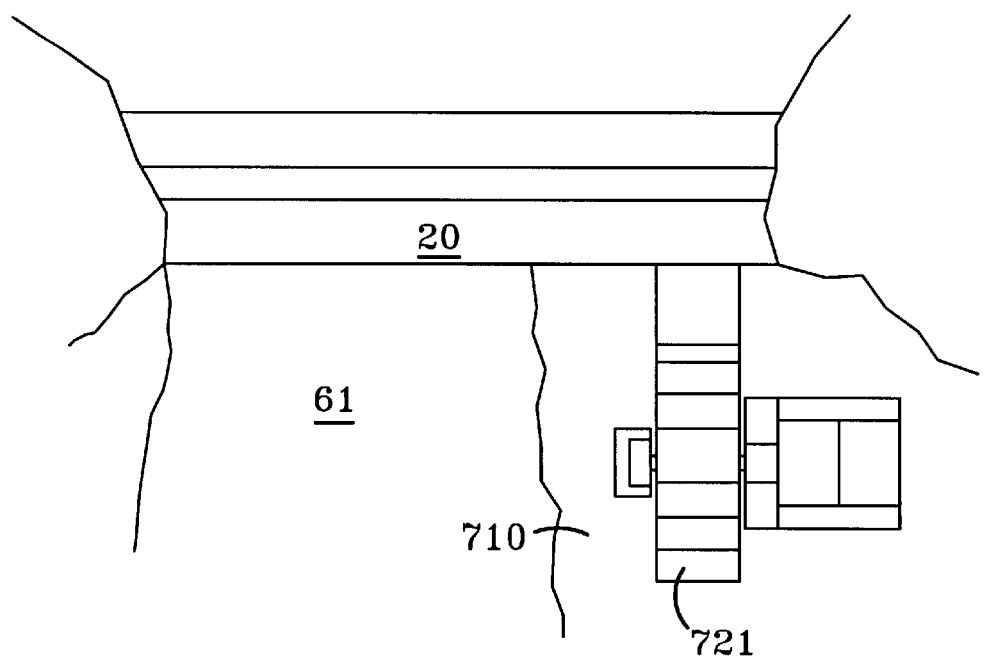
FIG. 11 is a topplan view similar to FIG. of yet another embodiment of the invention.
Figure 12:
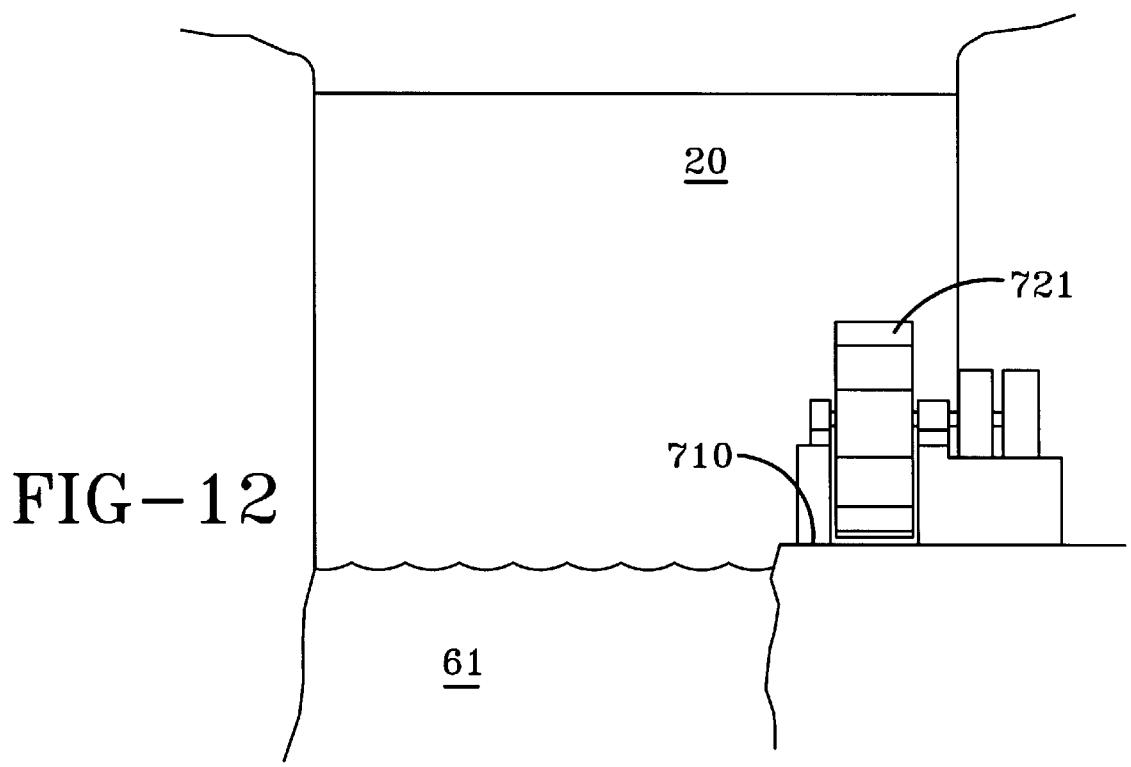
FIG. 12 is a front plan view of the embodiment described in FIG. 11.
Figure 13:
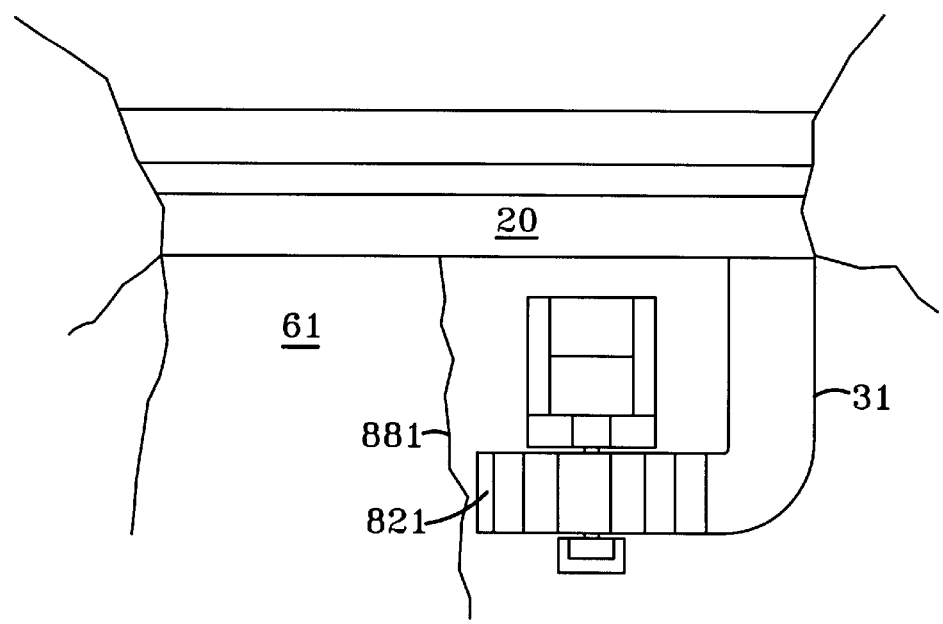
FIG. 13 is a top plan view similar to FIG. 11 of yet another embodiment of the invention.

The embodiment of the invention shown in FIG. 5 and FIG. 7 depicts a turbine 321 which is mounted to the spillway side structure 370 by means of supports 380 which are fastened to the side structures. In the embodiment of the invention shown in FIG. 8 the breastplate 422 is attached directly to the spillway area of the dam 420 and provides for water cascading down the spillway to enter the turbine 421 without the use of a penstock. In the embodiment of the invention shown in FIG. 9 the turbine 521 is situated father away from the dam 520 and receives water via a longer penstock 531. This penstock can be supported by a plurality of supports 514 of any suitable conventional nature. In the embodiment of the invention shown in FIG. 10, the penstock 631 approaches the turbine 621 in an overshot manner and in this arrangement a breastplate may not be required. FIG. 11 and FIG. 12 depict an embodiment of the invention where the turbine 721 is situated on dry land or a concrete apron 710 adjacent to the tailwater area 61. In the embodiment of the invention shown in FIG. 13, the turbine 821 is situated such that the direction of the discharge is approximately perpendicular to the shoreline 881.

Figure 14:
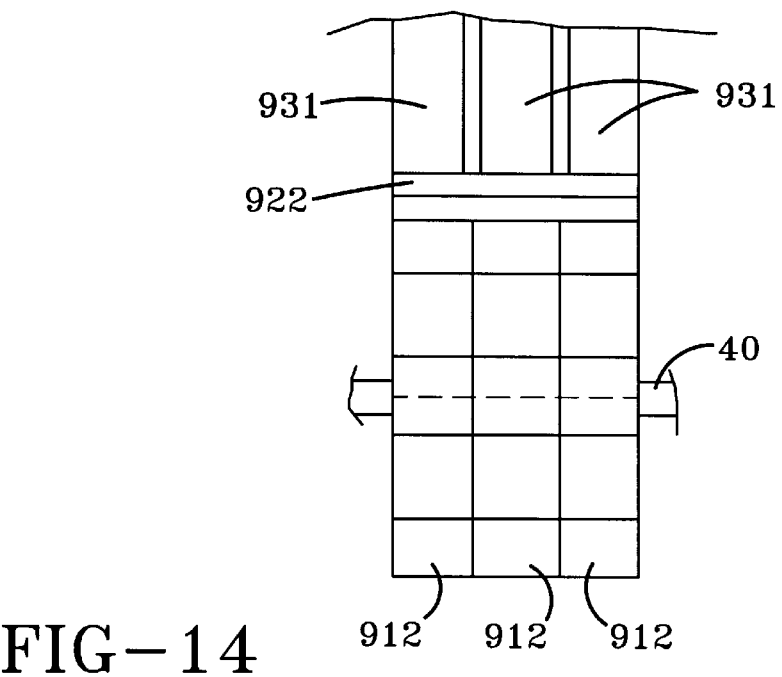
FIG. 14 is a top plan view similar to FIG. 5 of yet another embodiment of the invention.

In the embodiment of the invention shown in FIG. 14, three runner sections 912 are stacked together on a common axle 40. Three penstocks 931 are shown attached to a common breastplate 922.

Figure 15:
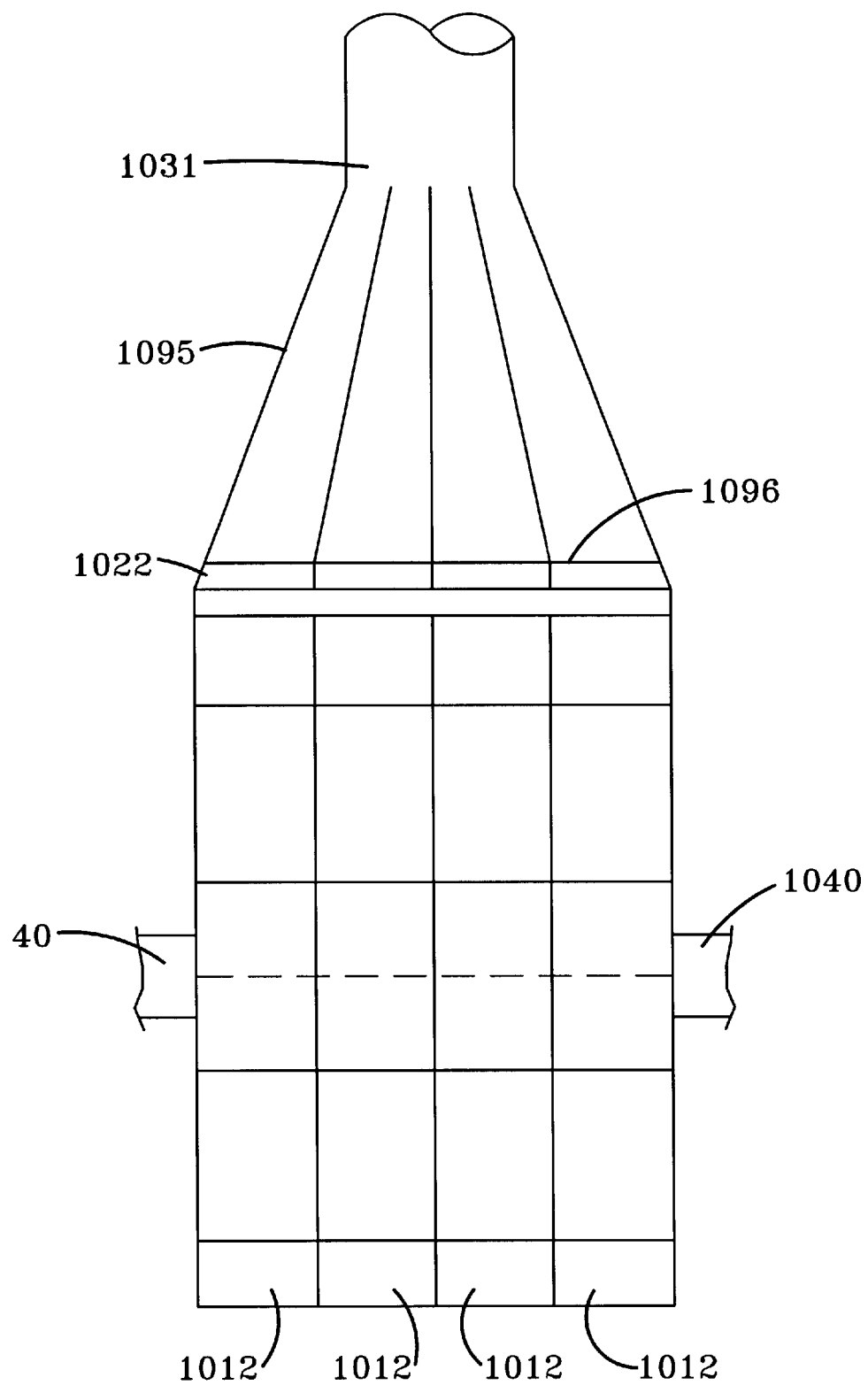
FIG. 15 is a top plan view similar to FIG. 14 of yet another embodiment of the invention.

In the embodiment of the invention shown in FIG. 15, four runner sections 1012 are stacked together on a common axle 1040. One penstock 1031 supplies water to a manifold 1095 which disperses water through four separate inlets 1096 and through the breastplate 1022.

Figure 16:
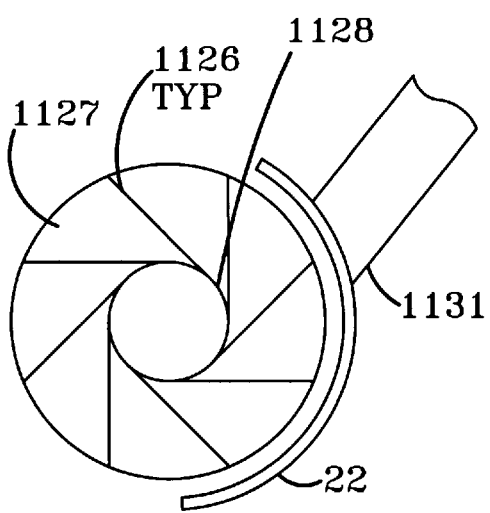
FIG. 16 is a cross sectional view similar to FIG. 2 of yet another embodiment of the invention.

The embodiment of the invention shown in FIG. 16 utilizes eight runner blades 1126 which are equally spaced around the runner barrel 1128. Each runner blade contacts the runner barrel in a tangential manner and is fastened to the runner barrel preferably by welding. The runner blades are also secured to the side plate 1127 in a similar manner. Ideally, with low head application the approach angle of the inlet or penstock 1131 as taken from the horizontal centerline of the turbine would equal 360° divided by the number of runner blades used in the turbine. Thus if eight runner blades are used, the approach angle would be 45°. This specification represents the preferred relationship between the runner blades and penstock in order to achieve the highest possible rotational speed. The exact number of runner blades used in the design of a given high torque turbine can vary and will generally increase as the head increases. The diameter of the penstock 1131 can vary depending on its length and can have more than one diameter on the same penstock. For instance, the diameter of the penstock near the dam may be larger than the diameter where it enters the breastplate. Ideally, the penstock diameter as it approaches the breastplate would be equal to the depth of the runner which is defined as the difference between the radius of the side plate 1127 and the runner barrel 1128. However, this relationship can vary depending on conditions and design criteria.

Figure 17:
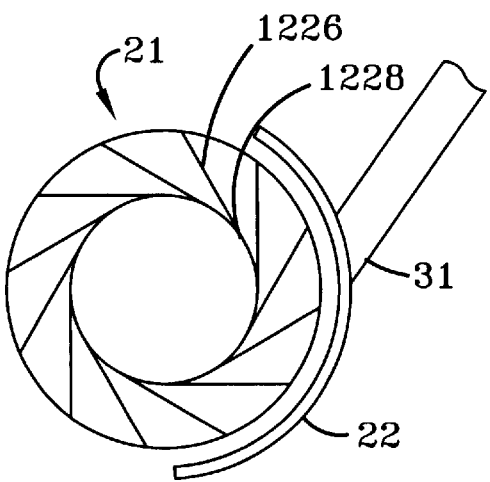
FIG. 17 is a cross sectional view similar to FIG. 16 of yet another embodiment of the invention.

In the embodiment of the invention shown in FIG. 17, a large number of runner blades 1226 are utilized with a runner barrel 1228 diameter which produces a more shallow runner system.

Figure 18:
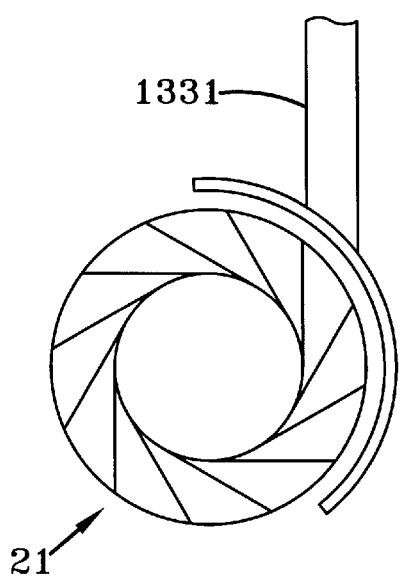
FIG. 18 is a cross sectional view similar to FIG. 16 of yet another embodiment of the invention.
Figure 19:
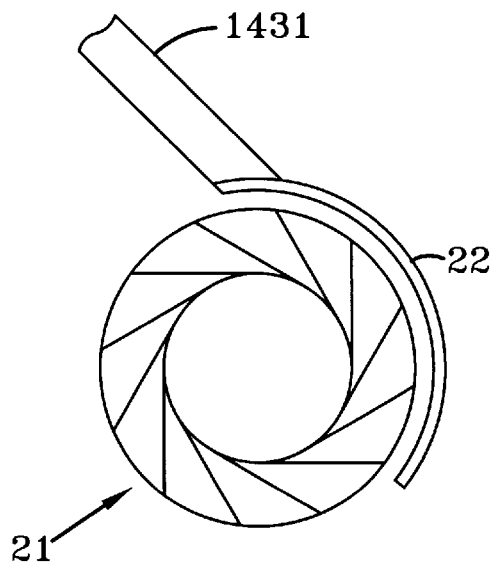
FIG. 19 is a cross sectional view similar to FIG. 16 of yet another embodiment of the invention.

In the embodiment of the invention shown in FIG. 18, a vertical penstock 1331 is utilized which constitutes an overshot approach and in FIG. 19 an extensive overshot approach is shown where the penstock 1431 approaches the turbine on the vertical centerline of the turbine. Approach angles of this type are best suited for medium to high head applications. In situations of this type, a higher rotational speed is developed due to a faster incoming velocity of the water. For these applications the breastplate can be eliminated, however, it may be useful to keep the breastplate to prevent early discharge of water due to centrifugal force. In cases where the rotational speed of the turbine is high enough, it may be possible to have a direct drive from the axle of the turbine to the generator, thus eliminating the speed increaser.

Figure 20:
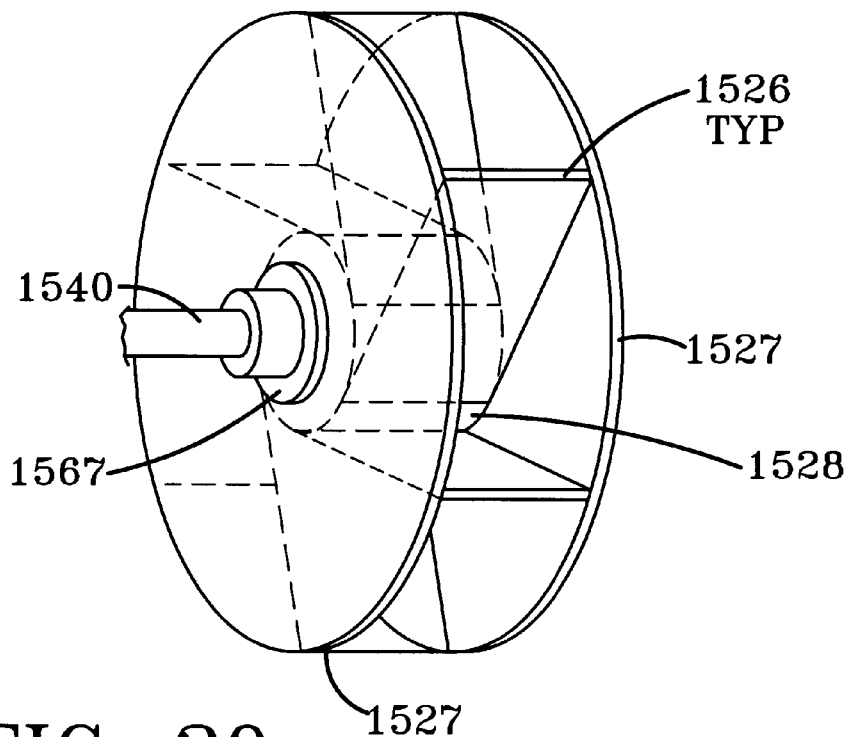
FIG. 20 is an enlarged perspective view of a turbine according to the invention.

In the embodiment of the invention shown in FIG. 20, six runner blades 1526 are depicted. These runner blades can be flat plates preferably made of stainless steel, aluminum or other suitable material. The runner blades may be fastened by any conventional means such as welding to the side plates 1527 and to the runner barrel 1528. The runner barrel 1528 is fastened to side plates 1527 by conventional means such as welding or bolts. In its preferred form, each side plate would be fitted with a hub 1567 which can be an integral part of the side plate or can be a separate piece which is fastened to the side plate by conventional means such as bolts. The center of the hub has a close tolerance bore to accommodate a close fit with the axle 1540 and would also include a keyway provision for direct drive of the axle. The side plate members also have a bore of a clearance size for the axle. The runner barrel 1528 consists of a cylinder with a large inside diameter. The outside diameter of the runner barrel comprises the bottom of the runner system. The entire turbine in its preferred form may be made of steel, aluminum or other suitable material such as high performance plastic.

Figure 21:
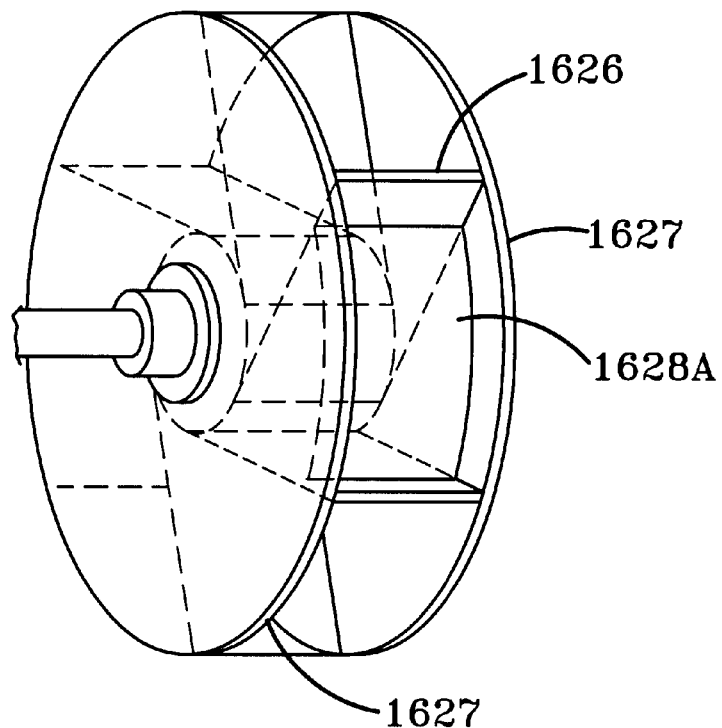
FIG. 21 is an enlarged perspective view similar to FIG. 20 of another embodiment of the invention.
Figure 22:
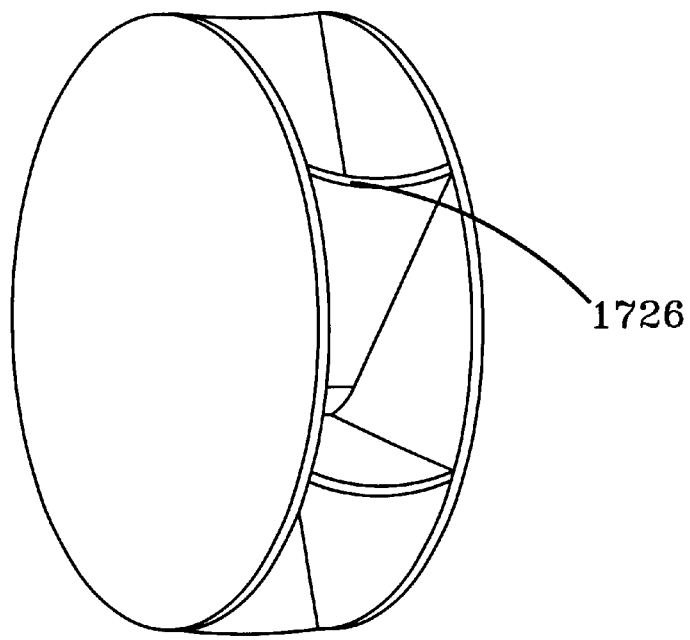
FIG. 22 is an enlarged perspective view similar to FIG. 20 of yet another embodiment of the invention.

In the embodiment of the invention shown in FIG. 21, a runner barrel section 1628A is disclosed. This barrel section is capable of being placed and removed as desired and, when in use, is intended to be secured to runner blades 1626 and side plates 1627. A plurality of barrel sections are used; one between every two runner blades, equal in number to the number of runner blades. In this manner, the barrel sections become the bottom of the runner which changes the volume of water the runner can accept. This also keeps the impact of the incoming water and the weight of the water closer to the periphery of the turbine which produces a high torque with the same volume of water. The runner barrel sections can be flat, concave, convex or some other shape as desired. Runner barrel sections may be used during periods of reduced water flow and removed during periods of higher flow.

Figure 23:
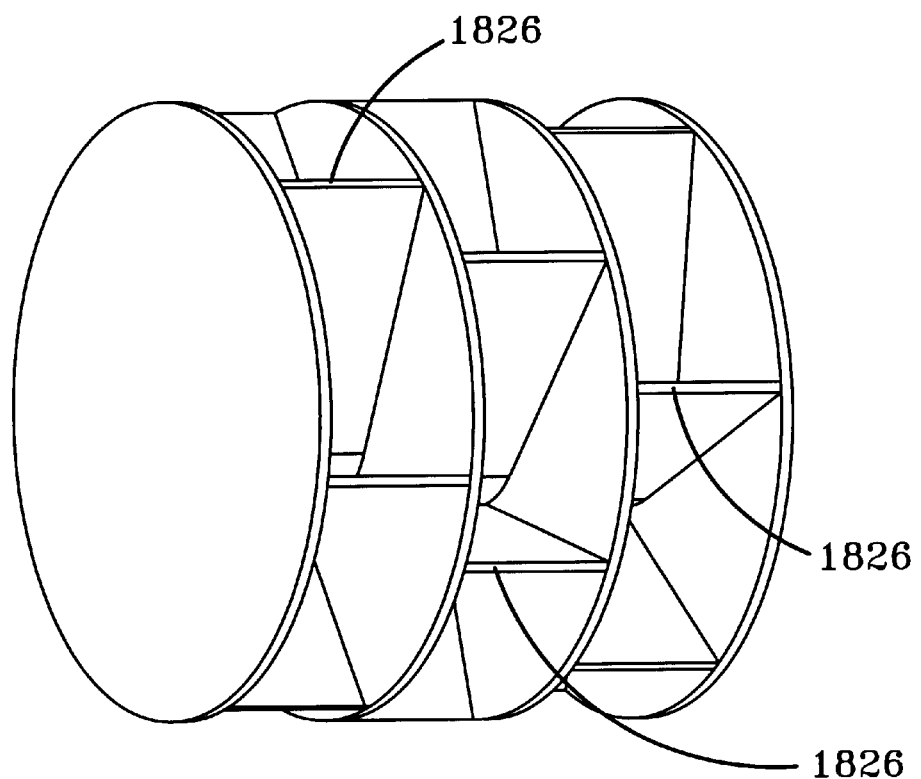
FIG. 23 is a perspective view similar to FIG. 20 of yet another embodiment of the invention.

The embodiment of the invention shown in FIG. 23 discloses three runner sections stacked together where the runner blades 1826 are not in line with each other from one runner section to the next runner section. This staggered effect may be used to help reduce pulsation effects from incoming water.

Figure 24:
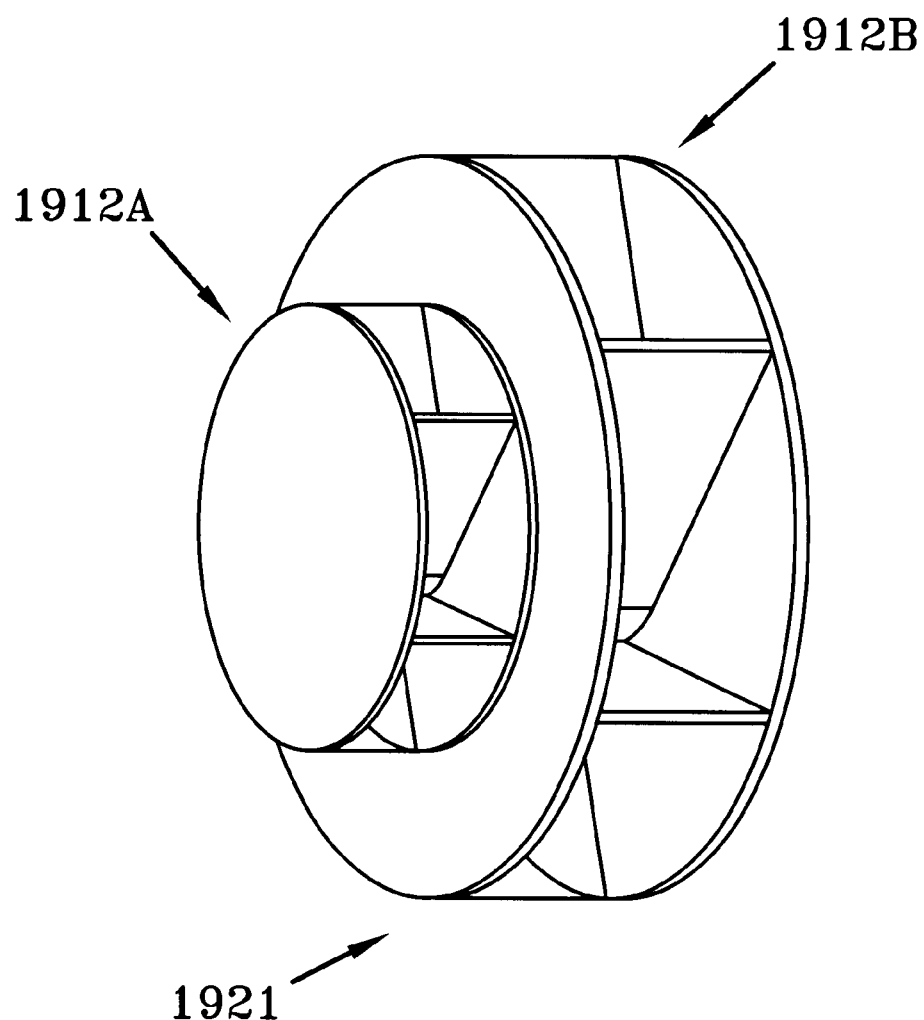
FIG. 24 is a perspective view similar to FIG. 20 of yet another embodiment of the invention.

In the embodiment of the invention shown in FIG. 24, a turbine 1921 with two runner sections 1912A, 1912B of different diameters is disclosed. In situations where the head and flow rate may vary frequently, the water flow can be directed from one runner section to the other to help maintain consistent speed of rotation and maximum available torque.

In general, turbine generating systems of this type can be constructed in various sizes ranging from a few kilowatts to 50 megawatts or more in output. An assortment of conventional control systems such as governors, valves and electrical relays can be utilized as desired. Any of a number of conventional housings can be utilized as desired to cover the turbine, gearbox, generator and control system to protect them from weather elements. The major benefit from the high torque turbine generating system is lower cost. This is due mostly to reduced work requirements for installation at dam sites. Another benefit is to provide a family of turbines regarding size and design characteristics to accommodate nearly all ranges of head and flow rates. Still another benefit is to provide for low cost installation of a power generating system in areas where no dam exists by connecting waterways with a higher elevation to waterways with a lower elevation by means of pipes or penstocks. This provides a water source with a head differential to a turbine generating system installed on the river bank in such a manner as to discharge water from the turbine into the river.

FIGS. 25–35 show yet, several additional embodiments of the present invention. Turning to FIGS. 25 and 26, a water turbine 2000 includes a wheel 2004 having a barrel 2002 mounted on an axle 2001. The wheel 2004 comprises at least a first runner section 2006. The first runner section 2006 has first and second sidewalls 2008, 2010, a bottom surface 2012, a plurality of full runner blades 2014, a plurality of partial blades 2016, and a plurality of buckets 2018. It should be noted that the bottom surface in the preferred embodiment is the outer surface of the previously mentioned barrel 2002. However, it is also contemplated that the bottom surface could be defined by other components such as by the axle 2001 for cases in which no barrel is used.

Figure 28:
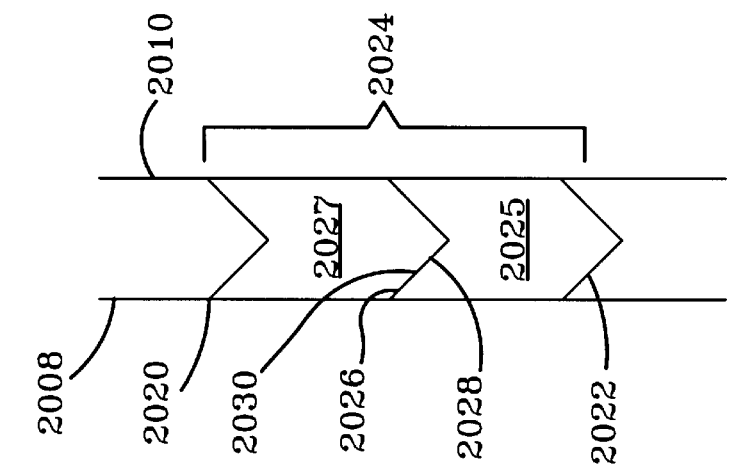
FIG. 28 is a side view of FIG. 27 showing one runner section.
Figure 27:
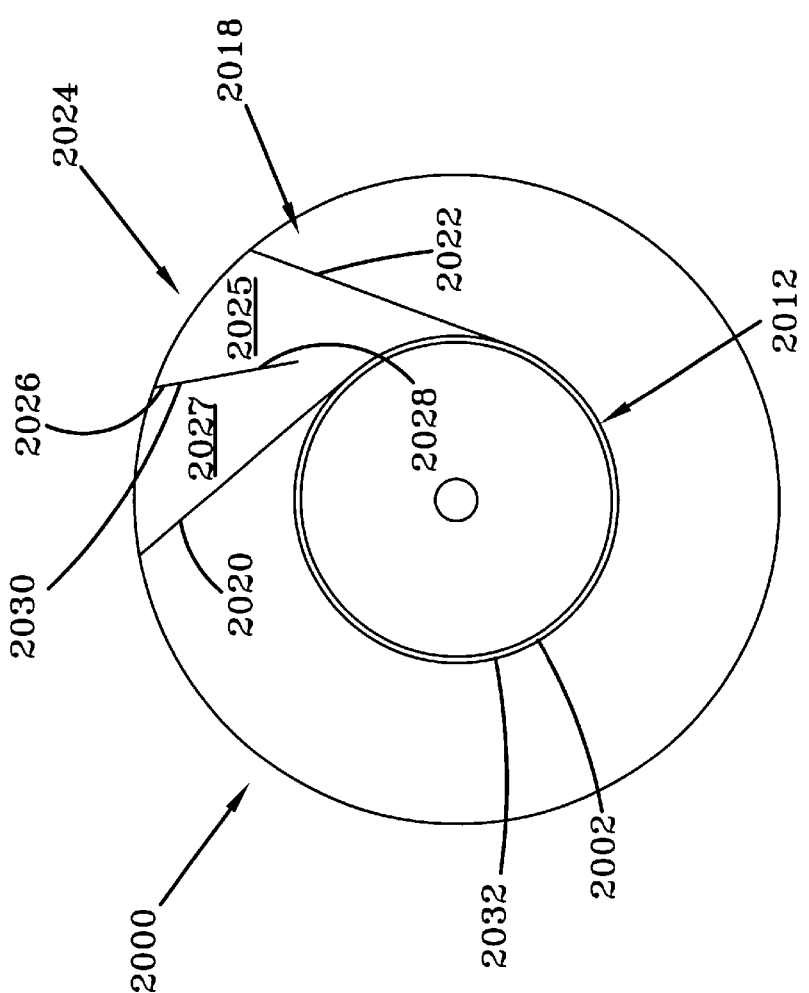
FIG. 27 is a cross sectional view of the present invention illustrating one bucket

One bucket will now be described in detail with the understanding that these features, are common to all the bucket s of the water turbine 2000. FIGS. 27 and 28 depict one bucket. First and second full runner blades 2020, 2022 define a first bucket 2024 together with the first and second sidewalls 2008, 2010 and the bottom surface 2012. The first and second full runner blades 2020, 2022 are interposed between the first and second sidewalls 2008, 2010 and are connected to the bottom surface 2012. A first partial blade 2026 has first and second sides 2028, 2030 and is interposed between the first and second sidewalls 2008, 2010 and between the first and second full runner blades 2020, 2022 within the first bucket 2024. The partial blades divide the bucket 2024 into a first bucket section 2025 and a second bucket section 2027. The first partial blade 2026 permits working fluid to travel from the first bucket section 2025 around the bottom of the first partial blade 2026 and into the second bucket section 2027 as the wheel 2004 rotates. As shown in FIG. 32, and explained in further detail below, the bottom surface 2012 may be curved.

Figure 30:
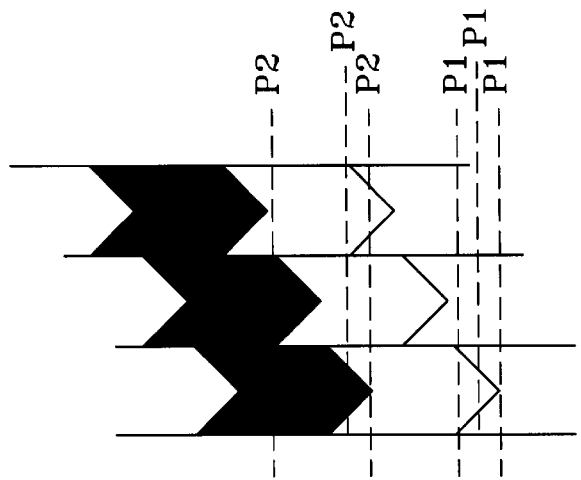
FIG. 30 is a side view of FIG. 29.
Figure 29:
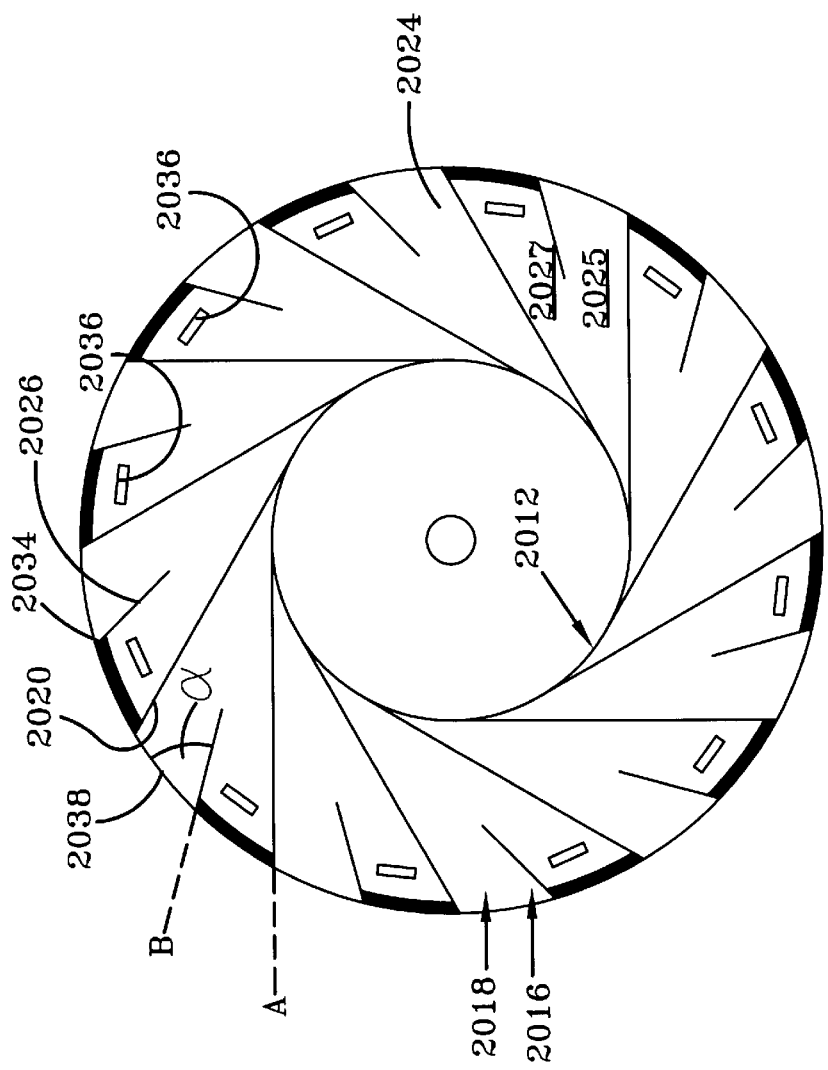
FIG. 29 is a cross sectional view of yet another embodiment of the present invention.

Turning now to FIGS. 29 and 30, another embodiment is shown where the first partial blade 2026 has a first end 2034 operatively connected to, preferably contacting, the first full blade 2020. Of course, the first end 2034 may alternatively be operatively connected to the second full runner blade 2022. The partial blade 2026 may be positioned between the bottom surface 2012 and the periphery of the sidewalls 2008, 2010. Continuing to view FIGS. 29 and 30, one or both of the sidewalls 2008, 2010 may include a vent 2036 for allowing working fluid to exit the bucket 2024. This is especially useful when the partial blade 2026. contacts the full blade 2020 because otherwise working fluid located within the second bucket section 2027 would not easily escape from the bucket as the wheel rotated. The applicant also contemplated the use of multiple vents 2036. When partial blades are used, the vent 2036 allows the working fluid to exit the bucket 2024 once working fluid impacts the second side 2030 of the partial blade 2026. The vent 2036 may be located at a radial edge 2038 near the perimeter of the sidewalls 2008, 2010 in the second bucket section 2027, as shown. Of course the vent 2036 may be located elsewhere on the sidewall 2008. Vents 2036 may also be positioned in each sidewall or only in one sidewall.

As shown in FIGS. 26, 30, 31, 33 and 35, the wheel 2004 may further comprise multiple runner sections 2040 operatively connected to the axle 2002. The multiple runner sections 2040 include similar components as the first runner section 2006. In one. embodiment, shown in FIG. 31, the sidewalls 2010, 2008 of adjacent runners 2006, 2040 may define an axial space 2042 therebetweeen such that working fluid exiting the buckets 2018 does not enter the adjacent runner section 2006, 2040. In yet another embodiment of the present invention, a deflector shield 2044 is positioned in the space 2042 to further deflect exiting working fluid. It also contemplated that some applications may add a second wheel (not shown) to the axle 2002 in order to achieve multiple runner sections.

In one of the embodiments, best seen in FIGS. 29 and 30, the first and second runner blades 2020, 2022 are straight and have a longitudinal axis A. Although not required, it is preferred that the ends of the first and second runner blades 2020, 2024 contact the bottom surface 2012 in a tangential relationship. The partial blades 2016, may be straight and have a longitudinal axis B. Preferably, the longitudinal axis B of the partial blade 2026 divides the bucket 2024 into the first bucket section 2025 and the second bucket section 2027. However, it is contemplated to be within the scope of this invention that the longitudinal axis B may be at any angle 58 relative to the periphery of the sidewalls 2008, 2010 provided that the working fluid may enter the first bucket section 2025, travel to the second bucket section 2027, and impact the second side 2030 of the partial blade 2026 before exiting the bucket 2024. Also, FIGS. 29 and 30 show the water turbine 2000 with multiple runner sections 2006, 2040, as previously described. In this embodiment, full runner blades 2014 and the partial blades 2016 define planes P1 and P2 in the axial direction. FIG. 29 shows that no two blades, partial or full, share the same plane in the axial direction; however, this is not a requirement to carry out the spirit and scope of the present invention.

Figure 31:
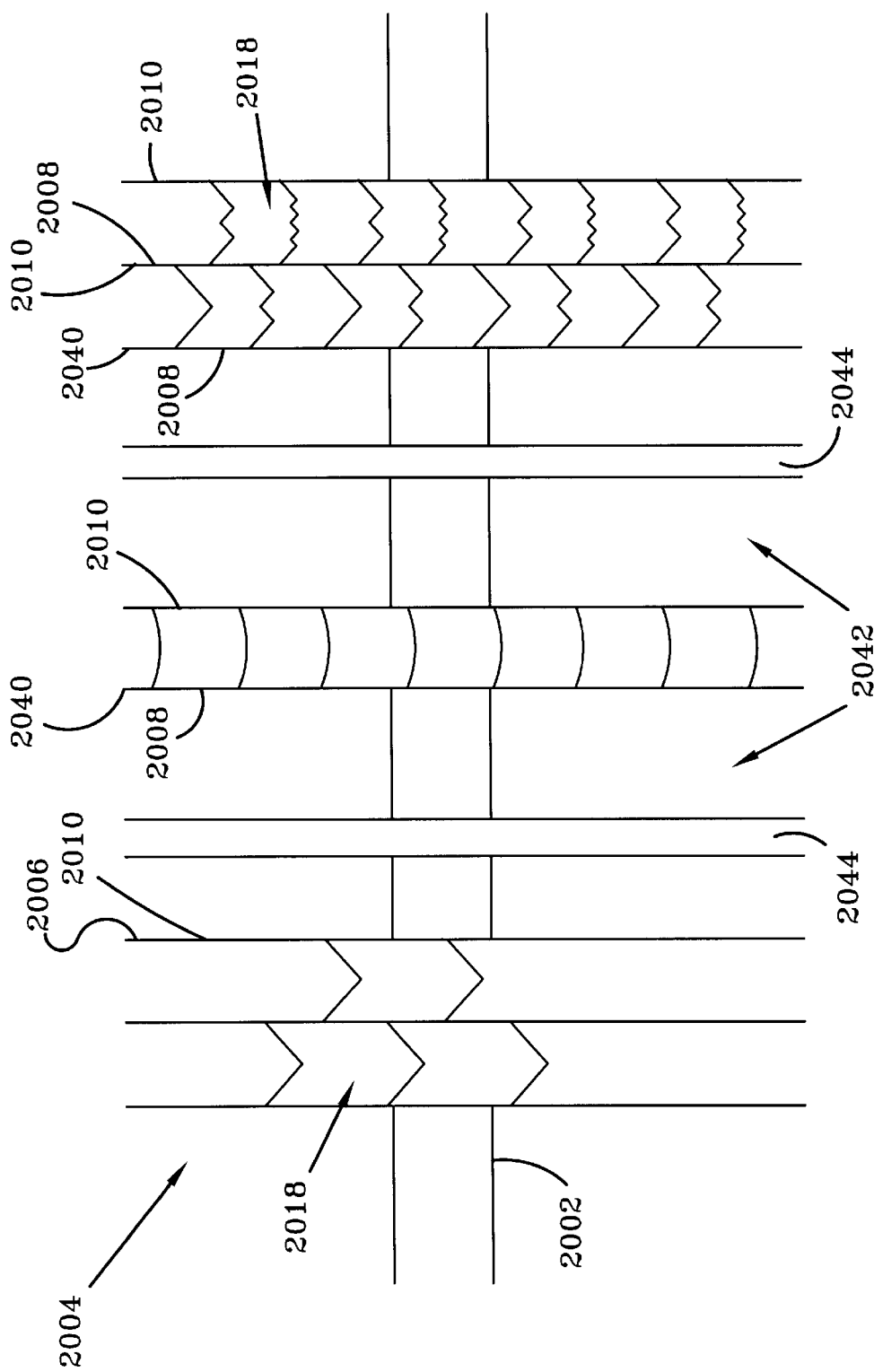
FIG. 31 is a side view of the present invention showing multiple runner sections.

Viewing FIG. 31, the full runner blades 2014 and partial runner blades 2016 may take a variety of shapes in cross section, both in the radial and axial directions. More specifically, these full and partial blades 2014, 2016 may be v-shaped, w-shaped, serrated, or arcuately shaped like a bicycle fender in the cross section width. In the radial direction, the full and partial blades 2014, 2016 may be straight, as previously described, or curved. These various shapes adjust the dynamic of working fluids (such as water) entering the wheel and how the buckets fill and how the wheel is rotated. It also contemplated that the full runner blades 2020, 2022 and/or partial blades 2026 of the same or different runner section may have a different cross-section, radially or axially, from other full runner blades 2020, 2022 and/or partial blades 2026, as shown in FIGS. 31 and 32. FIG. 32 shows an embodiment where the bottom surface 2012 defines a curved surface 2046 surface extending between the first and second full runner blades 2020, 2022. It is believed that this curved surface 2046 aids in the efficiency of the water turbine 2000.

In order to use the water turbine 2000 described above and shown in FIGS. 25–35, a turbine nozzle 2048 is schematically shown, which is positioned in a spaced relationship with the water turbine 2000. The turbine nozzle 2048 provides a working fluid, such as water, to the water turbine 2000. The water leaves the nozzle 2048 and enters at least one bucket 2024 of at least one runner section. The water enters the first bucket section and impacts the second full runner blade 2022, which causes the wheel 2004 to rotate. Water then travels within the bucket 2024 to the second bucket section and then impacts the second side 2030 of the partial blade 2026. In this way the working fluid creates a double impact with the water wheel—once when the working fluid contacts the second runner blade 2022 and twice when the same working fluid then contacts the second side of the partial blade 2026. This also causes the wheel 2004 to rotate. Once the bucket 2024 has filled with the working fluid and has rotated with the wheel a given distance, the working fluid is then discharged from the bucket 2024. It is believed that this double impacting results in greater water turbine 2000 efficiency. If the partial blade 2026 is connected to the first full runner blade 2020, the working fluid is discharged through the vents 2036 located in the sidewalls 2008, 2010.

Another embodiment of the present invention is shown in FIGS. 34 and 35. The water turbine 2000 is still structured to have a double impact effect from the working fluid that enters therein. However, this double impact does not occur within the same bucket. In this embodiment, the first and second runner blades 2020, 2022 are interposed between the first and second side walls 2008, 2010. The first and second full runner blades 2020, 2022 form the first bucket 2024 with the first and second side walls 2008, 2010. This is a similar configuration as previously described. The first bucket 2024 has a depth D1 measured from the radial edge 2038 of the sidewalls 2008, 2010 to the bottom surface 2012. As shown in FIGS. 34 and 35, each of the runner blades 2020, 2022 has a first end 2060 oppositely disposed from the second end 2062 The first end 2060 is adjacent to the radial edge 2038 of the sidewall 2008, 2010. The first and second runner blades 2020, 2022 extend into the first bucket 2024 a depth D2 where D2 is measured from the second end 2062 of the runner blade 2020, 2022 radially outward to the radial edge 2038. The runner blade depth and the first bucket depth form a ratio D2/D1 where D2/D1 ranges from substantially 0.5 to substantially 0.9. It is even more preferred that the ratio D2/D1 range from substantially 0.6 to 0.8. It is most preferred that the ratio D2/D2 be substantially 0.75. With this configuration, water enters the first bucket 2024 and impacts the second runner blade 2022. Once the first bucket 2024 impacts the second runner blade 2022, it travels down the length of the runner blade and then exits the bucket. The working fluid then travels about the bottom surface 2012 or barrel 2032, and then enters another bucket. Upon entering this second bucket, the working fluid impacts the runner blades again to result in a double impact effect. This configuration is also known as a bottomless bucket structure. It is desirable for the working fluid to impact the runner blades as long as possible so that more energy may be transferred from the working fluid to the full runner blades so that the wheel may rotate as efficiently as possible.

FIG. 34 shows that the water turbine 2000 with bottomless buckets may also comprise plurality of partial blades 2016 interposed between and the first and second side walls 2008, 2010 in between the first and second runner blades 2020, 2022 within the first bucket 2024. Like the runner blades 2020, 2022, the partial blades 2026 have a first end 2064 oppositely disposed from the second end 2066 with the first end 2064 being adjacent to the radial edge 2038 of the sidewall 2008, 2010. In this configuration, the first partial blade 2026 extends into the first bucket 2024 a depth D3 forming a ratio D3/D1. Again D3 is measured similarly as D2, that is from the second end 2066 of the first partial blade 2026 radially outward to the radial edge 2038. Preferably, D3/D1 ranges from substantially 0.25 to substantially 0.75. It is even more preferred that D3/D1 range from substantially 0.4 to substantially 0.6. And, it is most preferred that ratio D3/D1 be approximately 0.5. Again the reasoning for a higher ratio is so that the working fluid is constantly impacting or contacting the runner blades so that more energy is transferred to the wheel to rotate the same.

The invention has been described with reference to the preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A water turbine, comprising:
   an axle; and
   a wheel mounted upon said axle, said wheel comprising at least a first runner section that comprises,
   first and second sidewalls;
   a bottom surface;
   at least first second full runner blades interposed between said first and second sidewalls and connected to said bottom surface, wherein said first and second full runner blades form a first bucket with said first and second sidewalls and said bottom surface; and,
   at least a first partial blade being fixed to and extending between said first and second sidewalls and interposed between said first and second full runner blades within said first bucket, said first partial blade having a first side defining a first bucket section and a second side defining a second bucket section, said first partial blade permitting working fluid to travel from said first bucket section to said second bucket section within said first bucket as said wheel rotates.

2. The water turbine of claim 1, wherein at least one of said sidewalls comprises at least one vent that allows working fluid to exit said bucket.

3. The water turbine of claim 1, wherein said first partial blade has a first end contacting said first full blade.

4. The water turbine of claim 3, wherein at least said first sidewall comprises at least one vent for allowing working fluid to exit said second bucket section but not said first bucket section.

5. The water turbine of claim 1, wherein said first and second runner blades have a longitudinal axis A and said at least one partial blade has a longitudinal axis B, wherein said longitudinal axis A is in a tangentially spaced relationship with said bottom surface.

6. The water turbine of claim 5, wherein said longitudinal axis B forms an angle with the periphery of said first and second sidewalls.

7. The water turbine of claim 4, wherein said vent is located at a radial edge near the perimeter of said first sidewall.

8. The water turbine of claim 1, further comprising a second runner section operatively connected to said, said second runner section, comprising:
   first and second sidewalls;
   at least first and second full runner blades interposed between said first and second sidewalls and connected to said bottom surface, wherein said first and second full runner blades form a first bucket with said first and second sidewalls and said bottom surface; and, at least a first partial blade interposed between said first and second sidewalls and between said first and second full runner blades within said first bucket, said first partial blade having a first side defining a first bucket section and a second side defining a second bucket section, said first partial blade permitting working fluid to travel from said first bucket section to said second bucket section within said first bucket as said wheel rotates.

9. The water turbine of claim 8, wherein adjacent sidewalls of said first and second runner sections define an axial space therebetween.

10. The water turbine of claim 9, further comprising at least one deflector shield positioned in said axial space between said adjacent sidewalls.

11. The water turbine of claim 1, wherein said first partial blade is v-shaped in cross-section width.

12. The water turbine of claim 1, wherein said first partial blade is w-shaped in cross-section width.

13. The water turbine of claim 1, wherein said first partial blade is serrated-shaped in cross-section width.

14. The water turbine of claim 1, wherein at least one of said plurality of partial blades is arcuately shaped in cross section width.

15. The water turbine of claim 1, wherein at least one of said full runner blades and said bottom surface define a curved surface.

16. The water turbine of claim 1, wherein at least one of said full runner blades is v-shaped in the axial direction.

17. The water turbine of claim 1, wherein one full runner blade has a different cross section than said partial blade.

18. A method for using a water turbine, comprising the steps of:
providing a turbine having an axle and a wheel mounted upon said axle, said wheel comprising at least a first runner section that comprises first and second sidewalls, a bottom surface, at least first and second full runner blades interposed between said first and second sidewalls and connected to said bottom surface, wherein said first and second full runner blades form a first bucket with said first and second sidewalls and said bottom surface, at least a first partial blade being fixed to and extending between said first and second sidewalls and interposed between said first and second full runner blades within said first bucket, said first partial blade having a first side defining a first bucket section and a second side defining a second bucket section;
impacting said second full runner blade with a working fluid thereby beginning to fill said first bucket section with said working fluid and rotating said wheel about said axle;
directing said working fluid from said first bucket section to said second bucket section within said first bucket;
impacting said second side of said partial blade within said first bucket with said working fluid; and,
discharging said working fluid from said first bucket.

19. The method of claim 18, further comprising the steps of:
providing at least one vent in said fist side wall adjacent to said first bucket; and
wherein the step of discharging working fluid from said first bucket comprises the step of discharging at least a of portion said working fluid through said vent.

20. The method of claim 18, further comprising the steps of:
providing a first end of said partial blade into contact with said first full runner blade;
providing at least one vent in said first side wall adjacent to said second bucket section; and
wherein the step of discharging working fluid from said first bucket comprises the step of discharging said working fluid through said vent.

21. The method of claim 19 further comprising the steps of:
providing a second runner section operatively connected to said axle, said second runner section comprising first and second sidewalls, a bottom surface, at least first and second full runner blades interposed between said first and second sidewalls and connected to said bottom surface, wherein said first and second full runner blades form a first bucket with said first and second sidewalls and said bottom surface, at least a first partial blade interposed between said first and second sidewalls and between said first and second full runner blades within said first bucket, said first partial blade having a first side defining a first bucket section and a second side defining a second bucket section;
providing at least one vent in said fist side wall of said second runner section adjacent to said first bucket;
providing at least one deflector shield positioned between said first and second runner sections; and,
wherein the step of discharging working fluid from said first bucket comprises the step of striking said deflector shield with said working fluid so as to prevent said discharged working fluid from contacting said second runner section.

22. A water turbine, comprising:
an axle; and
a wheel having a perimeter mounted upon said axle, said wheel comprising at least a first runner section that comprises,
first and second sidewalls having a radial edge;
a bottom surface;
at least first and second full runner blades interposed between said first and second sidewalls, said first and second full runner blades forming a first bucket with said first and second sidewalls, said first bucket having a depth D1 measured from said bottom surface within said first bucket to a nearest point on said radial edge within said first bucket, said first and second full runner blades extending into said first bucket a depth D2, D2 being measured from said second end of said full runner blade radially outward to said radial edge, said full runner blade depth and first bucket depth forming a ratio D2/D1, where D2/D1 ranges from substantially 0.5 to substantially 0.9
at least a first partial blade being fixed to and extending between said first and second sidewalls and interposed between said first and second full runner blades within said first bucket.

23. The water turbine of claim 22, wherein said ratio D2/D1 is between 0.6 to 0.8.

24. The water turbine of claim 22, wherein said ratio D2/D1 is substantially 0.75.

25. The water turbine of claims 22, wherein said first partial blade extends into said first bucket a depth D3 forming a ratio D3/D1, D3 being measured from said second end of said first partial blade radially outward to said radial edge, wherein D3/D1 ranges from substantially 0.25 to substantially 0.75.

26. The water turbine of claim 25, wherein said ratio D3/D1 ranges from substantially 0.4 to substantially 0.6.

27. The water turbine of claim 26, wherein said ratio D3/D1 is approximately 0.5.

* * * * *